United States Patent
Kiyokami et al.

(10) Patent No.: US 11,143,288 B2
(45) Date of Patent: Oct. 12, 2021

(54) COOLING SYSTEM FOR VEHICLE DRIVING APPARATUS

(71) Applicant: TOYOTA JIDOSHA KABUSHIKI KAISHA, Toyota (JP)

(72) Inventors: Hiroaki Kiyokami, Toyota (JP); Kazuki Iwakura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 628 days.

(21) Appl. No.: 16/116,390

(22) Filed: Aug. 29, 2018

(65) Prior Publication Data
US 2019/0093755 A1    Mar. 28, 2019

(30) Foreign Application Priority Data
Sep. 25, 2017   (JP) .............................. JP2017-184220

(51) Int. Cl.
*F16H 57/04*    (2010.01)
*F01P 11/08*    (2006.01)
(Continued)

(52) U.S. Cl.
CPC .......... *F16H 57/0441* (2013.01); *F01M 1/02* (2013.01); *F01M 5/00* (2013.01); *F01M 5/005* (2013.01);
(Continued)

(58) Field of Classification Search
CPC ............ F01M 5/005; F01M 5/02; F01M 1/02; F01M 2001/0215; F01P 11/08;
(Continued)

(56) References Cited

U.S. PATENT DOCUMENTS 7,832,512 B2 * 11/2010 Watanabe ............. B60W 20/00
                                                        180/65.28
10,465,574 B2 * 11/2019 Kiyokami .............. B60K 6/445
(Continued)

FOREIGN PATENT DOCUMENTS

JP    2007-170533 A    7/2007
JP    2011-027142 A    2/2011
(Continued)

*Primary Examiner* — Michael R Mansen
*Assistant Examiner* — Mark K Buse
(74) *Attorney, Agent, or Firm* — Oliff PLC

(57) ABSTRACT

A cooling system includes: (a) a first pump to be driven with vehicle running; (b) a lubricating passage for supplying the lubricant from the first pump, to a lubrication-required part; (c) a second pump to be driven by a drive source other than a drive source of the first pump; (d) a cooling passage for supplying the lubricant from the second pump, to a rotary electric machine via a heat exchanger provided in the cooling passage; (e) a connecting passage connecting between the lubricating passage and the cooling passage, and (f) a lubricant distribution portion configured to change a connecting-passage flowing amount of the lubricant that flows through the connecting passage, depending on a temperature of the lubricant, such that a ratio of the connecting-passage flowing amount to a lubricating-passage flowing amount of the lubricant that flows through the lubricating passage is increased with increase of the lubricant temperature.

9 Claims, 12 Drawing Sheets

(51) Int. Cl.
*F01M 5/00* (2006.01)
*F01M 5/02* (2006.01)
*F01M 1/02* (2006.01)
*F16N 39/02* (2006.01)
*B60W 30/184* (2012.01)
*F01P 7/14* (2006.01)
*F01P 3/18* (2006.01)

(52) U.S. Cl.
CPC ............... *F01M 5/02* (2013.01); *F01P 11/08* (2013.01); *F16H 57/0415* (2013.01); *F16H 57/0476* (2013.01); *F16N 39/02* (2013.01); *B60W 30/1843* (2013.01); *B60Y 2200/92* (2013.01); *F01M 2001/0215* (2013.01); *F01M 2005/026* (2013.01); *F01P 3/18* (2013.01); *F01P 7/14* (2013.01); *F16N 2210/12* (2013.01)

(58) Field of Classification Search
CPC ............. F16H 57/0441; F16H 57/0415; F16H 57/0476; B60W 30/1843; B60Y 2200/92; F16N 2210/12
See application file for complete search history.

(56) References Cited

U.S. PATENT DOCUMENTS

| | | | |
|---|---|---|---|
| 2017/0175612 A1* | 6/2017 | Tokozakura | B60K 1/02 |
| 2017/0219085 A1* | 8/2017 | Kiyokami | F01M 1/02 |
| 2018/0045090 A1* | 2/2018 | Kiyokami | F16H 57/0441 |
| 2018/0045295 A1* | 2/2018 | Kiyokami | B60K 6/445 |
| 2018/0334025 A1* | 11/2018 | Hashimoto | B60K 6/365 |
| 2019/0081537 A1* | 3/2019 | Kiyokami | B60K 6/26 |

FOREIGN PATENT DOCUMENTS

| | | |
|---|---|---|
| JP | 2012-106599 A | 6/2012 |
| JP | 2017-114477 A | 6/2017 |
| JP | 2018-024405 A | 2/2018 |

\* cited by examiner

| RUNNING MODE | ENGINE 20 | MG1 | MG2 | P1 | P2 |
|---|---|---|---|---|---|
| EV RUNNING | STOPPED | FREE | POWER RUNNING | OPERATED | STOPPED |
| HV RUNNING | OPERATED | REGENERATING | FREE OR POWER RUNNING | OPERATED | OPERATED |

FIG.12

|  |  | HV RUNNING | EV RUNNING |
|---|---|---|---|
| HIGH TEMPERATURE | P1 | GEARS, BEARINGS | OIL COOLER & GEARS, BEARINGS |
| HIGH TEMPERATURE | P2 | OIL COOLER | PUMP OFF |
| LOW TEMPERATURE | P1 | GEARS, BEARINGS | GEARS, BEARINGS |
| LOW TEMPERATURE | P2 | OIL COOLER | PUMP OFF |

COOLING SYSTEM FOR VEHICLE DRIVING APPARATUS

This application claims priority from Japanese Patent Application No. 2017-184220 filed on Sep. 25, 2017, the disclosure of which is herein incorporated by reference in its entirety.

FIELD OF THE INVENTION

The present invention relates to a cooling system for cooling a driving apparatus that is provided in a vehicle for driving the vehicle, by supplying lubricant to the driving apparatus.

BACKGROUND OF THE INVENTION

In a driving apparatus for a vehicle, lubricant is used to cool elements such as a rotary electric machine which require to be cooled and also to lubricate elements which require to be lubricated daring running of the vehicle. JP2017-114477A discloses a cooling system for a driving apparatus to be disposed in a vehicle, wherein the cooling system includes: a cooling oil-pump configured to supply the lubricant to the rotary electric machine from a lubricant storage via a heat exchanger; and a lubricating oil-pump configured to supply the lubricant to the lubrication-required elements, without via the heat exchanger. In this disclosed cooling system, when the rotary electric machine and other elements require to be cooled, the lubricant supply from the cooling oil-pump via the heat exchanger is made. Meanwhile, regarding the lubrication in which the cooling is not preferable to avoid possible increase of a viscosity of the lubricant, the lubricant is supplied to the lubrication-required elements from the lubricating oil-pump without via the heat exchanger. Owing to this arrangement, the cooling of the rotary electric machine and other elements and the lubrication of the lubrication-required elements are both performed.

SUMMARY OF THE INVENTION

However, in the above-described arrangement, for example, when the lubricant is supplied only to the lubrication-required elements, namely, when the lubricant is supplied only from the lubricating oil-pump without via the heat exchanger, the lubricant cannot be cooled, even if the lubricant is heated to a high temperature and requires to be cooled. Consequently, a service life of the lubricant could be reduced.

The present invention was made in view of the background art described above. It is therefore an object of the present invention to provide a cooling system capable of appropriately cooling lubricant that is supplied from a lubricating oil-pump to elements of a driving apparatus in a vehicle.

The object indicated above is achieved according to the following aspects of the present invention.

According to a first aspect of the invention, there is provided a cooling system for a driving apparatus that is provided in a vehicle for driving the vehicle. The cooling system includes: (a) a first pump that is to be mechanically driven accompanying with running of the vehicle, to eject lubricant; (b) a lubricating passage configured to supply the lubricant ejected from the first pump, to a lubrication-required part of the driving apparatus; (c) a second pump that is to be driven by a second drive source that is other than a first drive source of the first pump, to eject the lubricant; (d) a cooling passage configured to supply the lubricant ejected from the second pump, to a rotary electric machine of the driving apparatus via a heat exchanger that is provided in the cooling passage; (e) a connecting passage that connects between the lubricating passage and a connected portion of the cooling passage, the connected portion being located on an upstream side of the heat exchanger in a direction of flow of the lubricant; and (f) a lubricant distribution portion provided in the connecting passage, and configured to change a connecting-passage flowing amount of the lubricant that flows through the connecting passage, depending on a temperature of the lubricant ejected from the first pump, such that a ratio of the connecting-passage flowing amount of the lubricant to a lubricating-passage flowing amount of the lubricant that flows through the lubricating passage is increased with increase of the temperature of the lubricant ejected from the first pump, namely, such that the connecting-passage flowing amount relative to the lubricating-passage flowing amount is increased with increase of the lubricant temperature. It is noted that the above-described lubrication-required part may include at least one element of the driving apparatus.

According to a second aspect of the invention, in the cooling system according to the first aspect of the invention, the lubricant distribution portion is configured to maintain supply of the lubricant to the lubrication-required part, irrespective of the temperature of the lubricant ejected from the first pump.

According to a third aspect of the invention, in the cooling system according to the first or second aspect of the invention, the lubricant distribution portion is configured to close the connecting passage when the temperature of the lubricant ejected from the first pump is not higher than a predetermined value.

According to a fourth aspect of the invention, in the cooling system according to any one of the first through third aspects of the invention, a pressure-dependent valve is provided in the connected portion of the cooling passage, and is configured to allow one of (i) the lubricant supplied from the first pump through the lubricating passage and the connecting passage and (ii) the lubricant supplied from the second pump through the cooling passage, to flow through the pressure-dependent valve, wherein the one of the lubricant supplied from the first pump and the lubricant supplied from the second pump has a pressure higher than the other.

According to a fifth aspect of the invention, in the cooling system according to any one of the first through fourth aspects of the invention, the lubricant distribution portion includes an opening/closing valve configured to selectively open and close the connecting passage, the connecting passage is provided with a check valve configured to inhibit flow of the lubricant in a direction toward the lubricating passage away from the cooling passage, and the opening/closing valve and the check valve are disposed in series in the connecting passage.

According to a sixth aspect of the invention, in the cooling system according to any one of the first through fifth aspects of the invention, the first pump is to be mechanically driven by a differential ring gear of the driving apparatus, and the second pump is to be driven by an engine of the driving apparatus.

According to a seventh aspect of the invention, in the cooling system according to any one of the first through sixth aspects of the invention, the lubricant distribution portion is a temperature-dependent valve that includes a temperature-sensitive member having a shape that is changeable depending on the temperature of the lubricant, such that the temperature-dependent valve changes an opening degree of the connecting passage, by change of the shape of the temperature-sensitive member which is caused by change of the temperature of the lubricant, and the temperature-dependent valve is configured to increase the opening degree of the connecting passage with increase of the temperature of the lubricant.

According to an eighth aspect of the invention, in the cooling system according to any one of the first through sixth aspects of the invention, the lubricant distribution portion is an orifice provided in the connecting passage.

According to a ninth aspect of the invention, in the cooling system according to any one of the first through fifth, seventh and eighth aspects of the invention, the second oil pump is to be driven by an electric motor that is other than the rotary electric machine.

The cooling system according to the first aspect of the invention includes: (a) a first pump that is to be mechanically driven accompanying with running of the vehicle, to eject lubricant; (b) a lubricating passage configured to supply the lubricant ejected from the first pump, to a lubrication-required part of the driving apparatus; (c) a second pump that is to be driven by a second drive source that is other than a first drive source of the first pump, to eject the lubricant; (d) a cooling passage configured to supply the lubricant ejected from the second pump, to a rotary electric machine of the driving apparatus via a heat exchanger that is provided in the cooling passage; (e) a connecting passage that connects between the lubricating passage and a connected portion of the cooling passage, the connected portion being located on an upstream side of the heat exchanger in a direction of flow of the lubricant; and (f) a lubricant distribution portion provided in the connecting passage, and configured to change a connecting-passage flowing amount of the lubricant that flows through the connecting passage, depending on a temperature of the lubricant ejected from the first pump, such that a ratio of the connecting-passage flowing amount of the lubricant to a lubricating-passage flowing amount of the lubricant that flows through the lubricating passage is increased with increase of the temperature of the lubricant ejected from the first pump. Thus, even when only the first pump is driven with the second pump being stopped, an increase of the lubricant temperature causes the lubricant to be supplied through the connecting passage to the cooling passage that is provided with the heat exchanger whereby the lubricant is appropriately cooled.

In the cooling system according to the second aspect of the invention, the lubricant distribution portion is configured to maintain supply of the lubricant to the lubrication-required part, irrespective of the temperature of the lubricant ejected from the first pump. Thus, the supply of the lubricant to the lubrication-required part is continued irrespective of the lubricant temperature, so that it is possible to restrain shortage of lubrication of the lubrication-required part.

In the cooling system according to the third aspect of the invention, the lubricant distribution portion is configured to close the connecting passage when the temperature of the lubricant ejected from the first pump is not higher than a predetermined value. Thus, when the lubricant temperature is not higher than the predetermined value, an amount of the lubricant flowing through the heat exchanger is reduced for thereby making it possible to restrain an increase of pressure loss of the lubricant due to an increase of viscosity of the lubricant that could be caused by a reduction of the lubricant temperature in the heat exchanger, and also to restrain a fuel economy reduction resulting from the increase of the pressure loss.

In the cooling system according to the fourth aspect of the invention, a pressure-dependent valve is provided in the connected portion of the cooling passage, and is configured to allow one of (a) the lubricant supplied from the first pump through the lubricating passage and the connecting passage and (ii) the lubricant supplied from the second pump through the cooling passage, to flow through the pressure-dependent valve, wherein the one of the lubricant supplied from the first pump and the lubricant supplied from the second pump has a pressure higher than the other. Thus, when the pressure of the lubricant flowing through the cooling passage is higher than the pressure of the lubricant flowing though the connecting passage, the connecting passage is closed by the pressure-dependent valve, so that the lubricant supplied from the first pump is delivered only to the lubrication-required part whereby the lubricating performance is increased. Meanwhile, the lubricant supplied from the second pump is delivered to the rotary electric machine through the cooling passage that is provided with the heat exchanger whereby the cooling performance is maintained.

In the cooling system according to the fifth aspect of the invention, the lubricant distribution portion includes an opening/closing valve configured to selectively open and close the connecting passage, the connecting passage is provided with a check valve configured to inhibit flow of the lubricant in a direction toward the lubricating passage away from the cooling passage, and the opening/closing valve and the check valve are disposed in series in the connecting passage. Thus, when the lubricant temperature is not higher than the predetermined value, the connecting passage is closed whereby an amount of the lubricant flowing through the heat exchanger is reduced for thereby making it possible to restrain an increase of pressure loss of the lubricant due to an increase of viscosity of the lubricant that could be caused by a reduction of the lubricant temperature in the heat exchanger, and also to restrain a fuel economy reduction resulting from the increase of the pressure loss. Further, when the lubricant temperature is higher than the predetermined value, a part of the lubricant ejected by the first pump as well as the lubricant ejected by the second pump is delivered to the cooling passage, so as to be cooled.

In the cooling system according to the sixth aspect of the invention, the first pump is to be mechanically driven by a differential ring gear of the driving apparatus, and the second pump is to be driven by an engine of the driving apparatus. Thus, during running of the vehicle, the first pump is driven whereby the lubricant is supplied to the lubrication-required part that requires to be lubricated during the running. Further, during an HV running of the vehicle in which the engine is driven with a required driving force being large, the second pump is driven whereby the lubricant is appropriately cooled.

In the cooling system according to the seventh aspect of the invention, the lubricant distribution portion is a temperature-dependent valve that includes a temperature-sensitive member having a shape that is changeable depending on the temperature of the lubricant, such that the temperature-dependent valve changes an opening degree of the connecting passage, by change of the shape of the temperature-sensitive member which is caused by change of the temperature of the lubricant, and the temperature-dependent valve is configured to increase the opening degree of the connecting passage with increase of the temperature of the lubricant. Thus, the amount of the lubricant flowing through the connecting passage is reduced with reduction of the lubricant temperature, whereby a pressure loss of the lubricant in the heat exchanger is reduced. Further, the opening degree of the connecting passage is increased with increase of the lubricant temperature, whereby a degree of the lubricant cooling is increased.

In the cooling system according to the eighth aspect of the invention, the lubricant distribution portion is an orifice provided in the connecting passage. Thus, the amount of the lubricant flowing through the connecting passage can be appropriately adjusted by a simple construction. The amount of the lubricant flowing through the connecting passage is reduced with reduction of the lubricant temperature, whereby a pressure loss of the lubricant in the heat exchanger is reduced. Further, the amount of the lubricant flowing through the connecting passage is increased with increase of the lubricant temperature, whereby a degree of the lubricant cooling is increased.

In the cooling system according to the ninth aspect of the invention, the second oil pump is to be driven by an electric motor that is other than the rotary electric machine. Thus, it is possible to employ an arrangement in which, for example, a rotation of the electric motor is adjusted depending upon increase or reduction of the lubricant temperature, whereby the amount of the lubricant supplied from the second pump can be adjusted depending on the lubricant temperature.

BRIEF DESCRIPTION OF THE DRAWINGS

FIG. 12 is a table showing, by way of example, an arrangement of the cooling system of FIG. 11 in which destination of supply of lubricant is changed depending on a temperature of the lubricant during each of the two kinds of running modes;

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
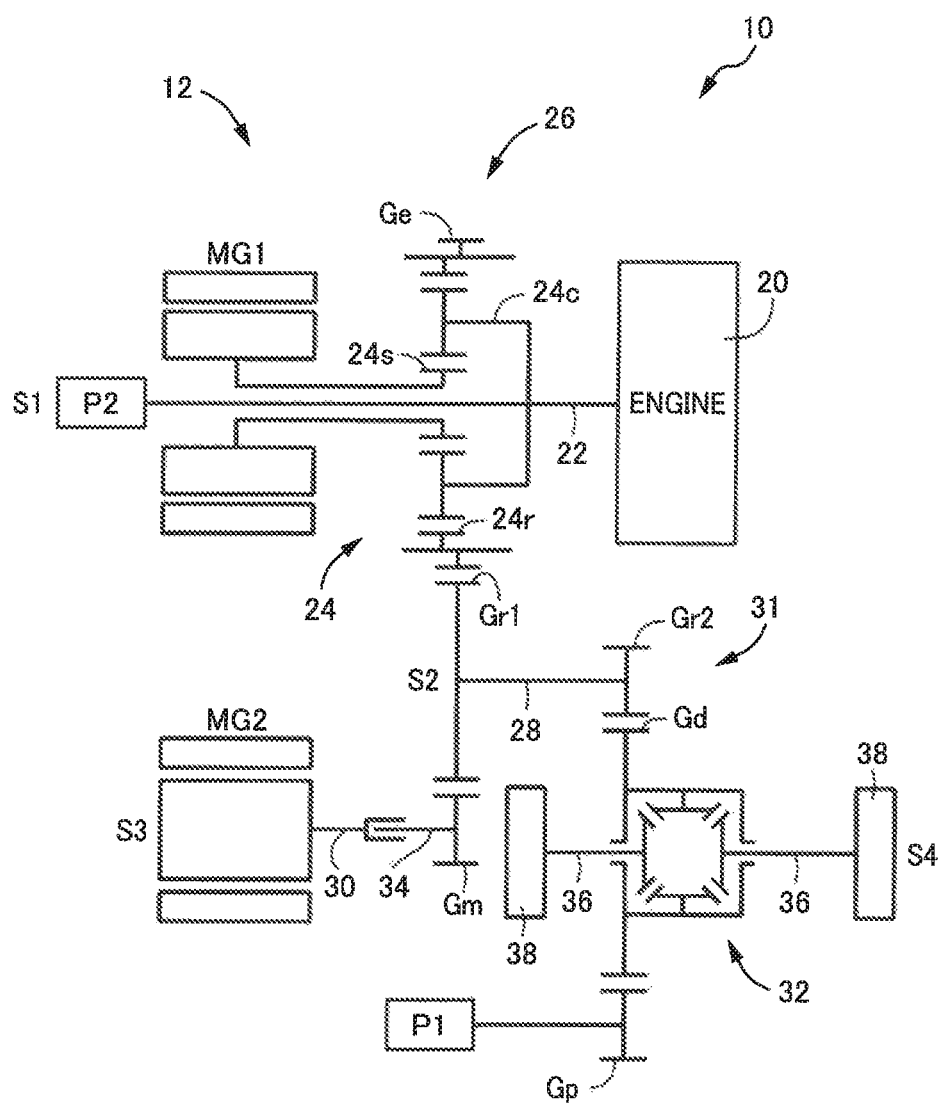
FIG. 1 is a schematic view showing a driving apparatus of a hybrid vehicle to which the present invention is advantageously applied.
Figures 2, 3:
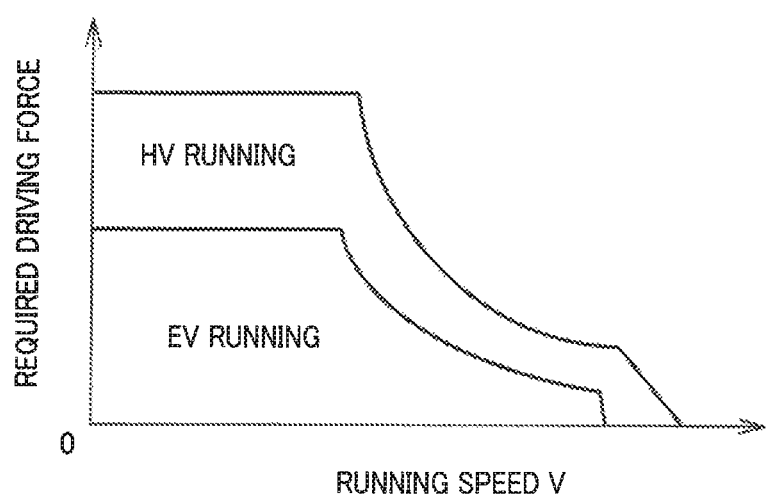
FIG. 2 is a table showing two kinds of drive modes that can be performed by the hybrid vehicle of FIG. 1.
FIG. 3 is a map showing, by way of example, regions in which the respective two kinds of drive modes are performed.

FIG. 1 is a schematic view showing a driving apparatus 12 of a hybrid vehicle 10 to which the present invention is advantageously applied. The view of FIG. 1 is a development view illustrating the driving apparatus 12 in a manner in which a plurality of axes of the driving apparatus 12 are contained in a single plane. FIG. 2 is a cross sectional view showing a positional relationship among the plurality of axes of the driving apparatus 12. The driving apparatus 12 is a transaxle suitably used for a FF hybrid vehicle and installed in the vehicle 10 such that the plurality of axes extend in a lateral (transverse) direction of the vehicle. The driving apparatus 12 is partially stored within a transaxle casing (not shown).

The driving apparatus 12 has the first through fourth axes S1-S4 that are substantially parallel with the lateral direction of the vehicle 10. On the first axis S1, an input shat 22 is disposed to be connected to an engine 20, and a second pump P2 as a mechanically-operated oil pump is disposed to be driven by the engine 20. A planetary gear set 24 of a single-pinion type and a first motor-generator MG1 (that corresponds to a first rotary electric machine as one of rotary electric machines) are provided to be coaxial with the first axis S1. The planetary gear set 24 and the first motor-generator MG1 cooperate to constitute an electrically-controlled differential portion 26. The input shaft 22 is connected to a carrier 24c of the planetary gear set 24 as a differential mechanism. The first motor-generator MG1 is connected to a sun gear 24s of the planetary gear set 24. An engine output gear Ge is connected to a ring gear 24r of the planetary gear set 24. The carrier 24c, the sun gear 24s and the ring gear 24r correspond to first, second and third rotary elements of the planetary gear set 24, respectively. The first motor-generator MG1 corresponds to a differential-control rotary machine, and is selectively used as an electric motor or as an electric generator. With a rotating speed of the sun gear 24s being continuously controlled in regenerative control or the like in which the first motor-generator MG1 functions as the electric generator, a rotating speed of a rotary motion transmitted from the engine 20 is continuously changed, and then the rotary motion is outputted through the engine output gear Ge. When a torque of the first motor-generator MG1 is set to 0 to idle the sun gear 24s, the engine 20 is prevented from being dragged to be rotated. The engine 20 is an internal combustion engine configured to generate power by combustion of fuel.

The counter shaft 28, which is disposed on the second axis S2, is provided at its axially opposite end portions with a large-sized reduction gear Gr1 and a small-sized reduction gear Gr2 that cooperate with the counter shaft 28 to constitute a reduction gear device 31. The large-sized reduction gear Gr1 is in mesh with the engine output gear Ge and also with a motor output gear Gm of a second motor-generator MG2 (that corresponds to a second rotary electric machine as another one of rotary electric machines) disposed on the third axis S3. The motor output gear Gm is mounted on a power transmitting shaft 34 that is splined to a rotor shaft 30 of the second motor-generator MG2, such that the power transmitting shaft 34 is unrotatable relative to the rotor shaft 30 about the third axis S3. The second motor-generator MG2 is selectively used as an electric motor or as an electric generator. With the second motor-generator MG2 being subjected to a power-running control to function as the electric motor, the second motor-generator MG2 is used as a drive power source for driving the hybrid vehicle 10.

The small-sized reduction gear Gr2 is in mesh with a differential ring gear Gd of a differential device (differential gear set) 32 disposed on the fourth axis S4, so that driving forces from the engine 20 and the second motor-generator MG2 are distributed to left and right drive shafts 36 via the differential device 32 so as to be transmitted to left and right drive wheels 38. The differential ring gear Gd of the differential device 32 is connected, through a pump driving gear Gp, to a first pump P1 that is a mechanically-operated oil pump to be mechanically driven. The engine output gear Ge, large-sized reduction gear Gr1, small-sized reduction gear Gr2, motor output gear Gm and differential ring gear Gd cooperate to constitute at least a part of a gear mechanism of the driving apparatus 12.

In the hybrid vehicle 10 described above, an EV running mode and an HV running mode can be carried out as shown in FIG. 2. For example, as shown in FIG. 3, the running mode is switched between the EV running mode and the HV running mode, in accordance with a mode switching map that is determined using a required driving force (such as an accelerator operation amount) and a vehicle running speed V as parameters. The EV running mode is a mode in which the vehicle runs using the second motor-generator MG2 as the drive power source by power-running controlling the second motor-generator MG2 in a state where the rotation of the engine 20 is stopped, and is selected in a range of low required driving force, i.e. low load. In the EV running mode, for example, supply of fuel to the engine 20 is stopped, and the torque of the first motor-generator MG1 is set to 0 to allow the sun gear 24s of the planetary gear device 24 to be rotated at a certain speed, which allows no rotation of the engine 20 connected with the carrier 24c of the planetary gear device 24 even with the ring gear 24r of the planetary gear device 24 being rotated at a certain speed that is dependent on a running speed V of the vehicle, so that the rotation of the engine 20 is substantially stopped even during running of the vehicle. The HV running mode is a mode in which the vehicle runs using the engine 20 as the drive power source by regeneratively controlling the first motor-generator MG1, and is selected in a range of high required driving three (high load) compared to the EV running mode. In the HV running mode, the second motor-generator MG2 is subjected to the power-running control in an assisting manner, for example, upon acceleration of the vehicle, so as to be used as the drive power source, or is constantly subjected to the power-running control so as to be used as the drive power source.

The above-described driving apparatus 12 of the hybrid vehicle 10 is merely an example of a power transmission device that is recited in the appended claims. The driving apparatus 12 may be modified as needed. For example, the planetary gear set 24 may be a planetary gear set of double-pinion type, or may be replaced by a plurality of planetary gear sets. Further, the second motor-generator MG2 may be disposed to be coaxial with the first axis S1. Moreover, the electrically-controlled differential portion 26 may be replaced by a mechanically-operated transmission device.

Figure 4:
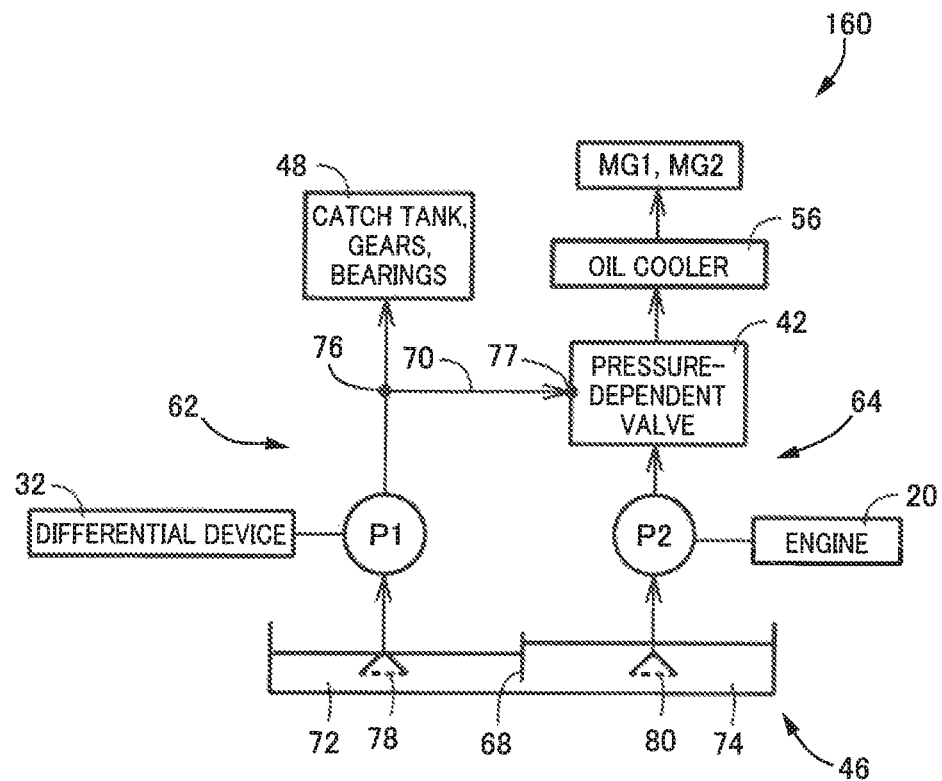
FIG. 4 is a view showing, by way of example, a cooling system provided in the hybrid vehicle of FIG. 1.

FIG. 4 is a diagram showing, in a simplified manner, a cooling system 160 for the driving apparatus 12, wherein the cooling system 160 include: the first pump P1 to be mechanically driven by a first drive source in the form of the differential ring gear Gd of the differential device 32; and the second pump P2 to be mechanically drive by a second drive source in the form of the engine 20. Lubricant ejected by the first and second pumps P1, P2 are supplied to various elements of the driving apparatus 12. The lubricant, which is to be ejected by the first and second pumps P1, P2, is stored in a lubricant storage 46 that is divided, by a partition wall 68, into a first lubricant storing portion 72 and a second lubricant storing portion 74. The first pump P1 has an inlet port 78 that is provided in the first lubricant storing portion 72, and supplies the lubricant via a first passage 62 (that corresponds to a lubricating passage) to a lubrication-required part 48 of the driving apparatus 12 such as a catch tank, gears and bearings. The second pump P2 has an inlet port 80 that is provided in the second lubricant storing portion 74, and supplies the lubricant via a second passage 64 (that corresponds to a cooling passage) to a pressure-dependent valve 42, an oil cooler 56 (corresponding to a heat exchanger) and the first and second motor-generators MG1, MG2 (each corresponding to a rotary electric machine). The first and second passages 62, 64 are connected to each other through a connecting passage 70 (that may be referred also to as a bypass passage). The connecting passage 70 is connected at a junction 76 as one of its opposite ends with the first passage 62, and is connected at another junction 77 as another one of its opposite ends with the second passage 64. It is noted that, although the pressure-dependent valve 42 is actually disposed in the junction 77 at which the connecting passage 70 is connected to the second passage 64, it is illustrated in FIG. 4 that the junction 77 is located at a connection between the pressure-dependent valve 42 and the connecting passage 70, merely for the convenience purpose. As described above, the lubricant storage 46 is divided, by the partition wall 68, into the first and second lubricant storing portions 72, 74, and each of the inlet ports 78, 80 is located in a corresponding one of the first and second lubricant storing portions 72, 74. Thus, an amount of ejection or suction of the lubricant made by each of the first and second pumps P1, P2 can be independently set, depending on an amount of the lubricant returned into a corresponding one of the first and second lubricant storing portions 72, 74. As shown in FIG. 4, the partition wall 68 has, in its lower end portion, an opening that functions as an orifice passage. However, the provision of the opening is not essential, because, when the lubricant is returned to one of the two lubricant storing portions 72, 74 much more than to the other, the lubricant overflowing in the one of the two lubricant storing portions 72, 74 may pass over the partition wall 68 so as to be supplied to the other of the two lubricant storing portions 72, 74.

Figure 5:
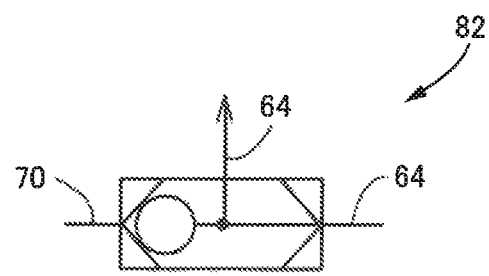
FIG. 5 is a view showing, by way of example, a pressure-dependent valve used in the cooling system of FIG. 4.

FIG. 5 shows a shuttle valve 82 as an example of the pressure-dependent valve 42. The shuttle valve 82 is configured to allow one of the lubricant supplied from the first pump P1 through the first passage 62 and the connecting passage 70 and the lubricant supplied from the second pump P2 through the second passage 64, to be delivered toward the oil cooler 56, wherein the allowed one of the lubricant supplied from the first pump P1 and the lubricant supplied from the second pump P2 has a pressure higher than the other. The lubricant delivered to the oil cooler 56 is cooled by the oil cooler 56, and is then delivered to the first and second motor-generators MG1, MG2.

Figure 6:
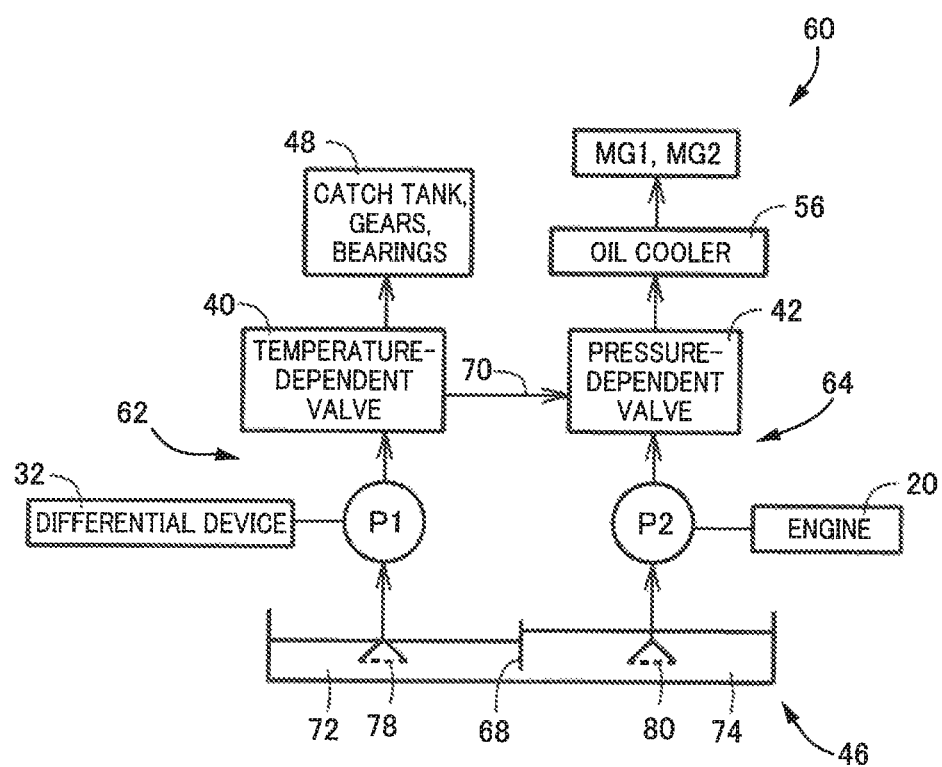
FIG. 6 is a view showing, in a simplified manner, a cooling system for a driving apparatus that is provided in the hybrid vehicle of FIG. 1.
Figure 7:
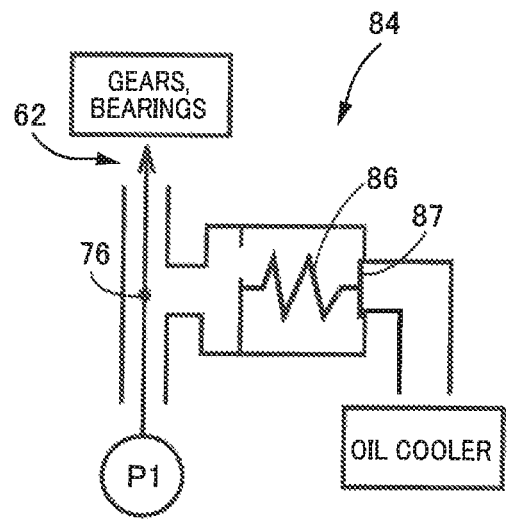
FIG. 7 is a view showing, by way of example, a major portion of a lubricant distribution portion included in the cooling system of FIG. 6, in a state in which a connecting passage is closed.
Figure 8:
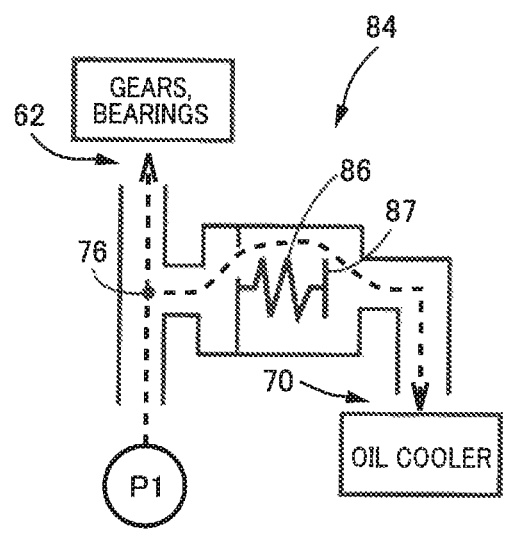
FIG. 8 is a view showing, by way of example, the major portion of the lubricant distribution portion included in the cooling system of FIG. 6, in a state in which the connecting passage is opened.

FIG. 6 shows a cooling system 60 constructed according to a first embodiment of the invention. This cooling system 60 is different from the above-described cooling system 160 of FIG. 4 in that a lubricant distribution portion in the form of a temperature-dependent valve 40 is provided in the junction 76 at which the connecting passage 70 is connected to the first passage 62. The cooling system 60 is substantially the same as the cooling system 160 of FIG. 4 except for the provision of the temperature-dependent valve 40, so that the same reference signs as used in FIG. 4 will be used to identify the functionally corresponding elements, and descriptions thereof are not provided. It is noted that the temperature-dependent valve 40 does not have to be provided necessarily in the junction 76 but may be provided in the other junction 77 or even in a non-opposite end portion of the connecting passage 70. FIGS. 7 and 8 show a temperature-dependent opening/closing valve 84 as an example of the temperature-dependent valve 40. The temperature-dependent opening/closing valve 84 may be a thermostat, and includes a valve body 87 and a temperature-sensitive member 86 (e.g., shape memory alloy) that is expanded with temperature reduction and is contracted with temperature increase so as to displace the valve body 87 toward and away from its valve seat thereby selectively closing and opening the temperature-dependent opening/closing valve 84. The temperature-sensitive member 86 of the temperature-dependent opening/closing valve 84 may be a wax element whose volume is changed with temperature change. In the present embodiment, the temperature-dependent opening/closing valve 84 is disposed in the junction 76. FIG. 7 shows a state in which a temperature To of the lubricant supplied from the first pump P1 is not higher than a predetermined value (shut-off temperature) Toa so that the connecting passage 70 is closed by the valve body 87 that is seated on its valve seat as a result of expansion of the temperature-sensitive member 86. In this state in which the lubricant temperature To is not higher than the predetermined value Toa, the lubricant supplied from the first pump P1 is delivered to the lubrication-required part 48 but is not delivered to the oil cooler 56. FIG. 8 shows a state in which the temperature To of the lubricant supplied from the first pump P1 is higher than the predetermined value Toa so that the connecting passage 70 is opened by the valve body 87 that is away from the valve seat as a result of contraction of the temperature-sensitive member 86 by increase of the lubricant temperature To, whereby the lubricant supplied from the first pump P1 is delivered to the lubrication-required part 48 and is delivered also toward the oil cooler 56 through the connecting passage 70. It is possible to employ an arrangement in which the temperature-sensitive member 86 of the temperature-dependent opening/closing valve 84 is made of a material that is contracted substantially continuously with increase of the lubricant temperature To. In such art arrangement, an opening degree of the temperature-dependent opening/closing valve 84 (that is dependent on a position of the valve body 87 relative to the valve seat) is small when the lubricant temperature To is higher than the predetermined value Toa by a small degree, and is increased with increase of the lubricant temperature To. Thus, a ratio of an amount of the lubricant flowing through the connecting passage 70 to an amount of the lubricant flowing through the first passage 62 is increased with increase of the temperature To of the lubricant supplied from the first pump P1.

Figure 9:
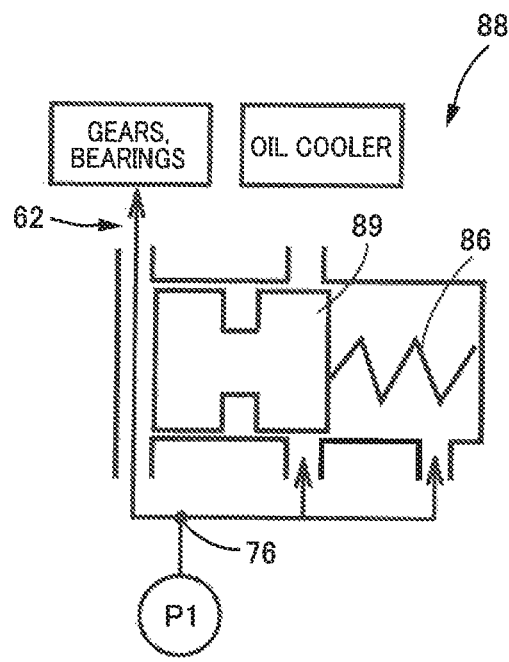
FIG. 9 is a view showing, by way of another example, a major portion of a lubricant distribution portion included in the cooling system of FIG. 6, in a state in which a connecting passage is closed.
Figure 10:
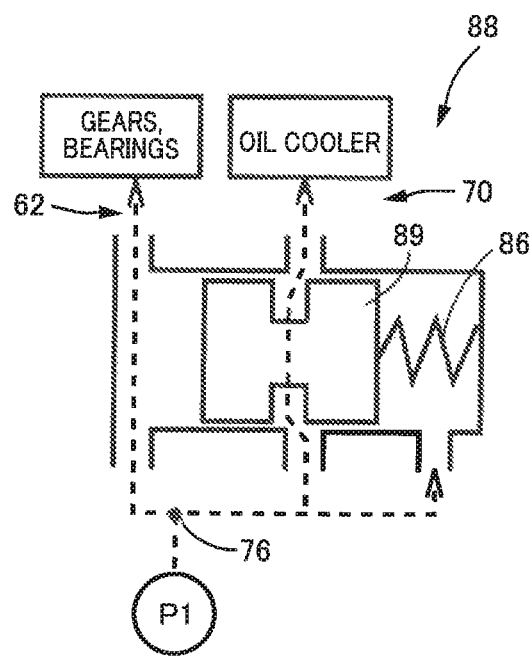
FIG. 10 is a view showing, by way of another example, the major portion of the lubricant distribution portion included in the cooling system of FIG. 6, in a state in which the connecting passage is opened.

FIGS. 9 and 10 show a temperature-dependent spool valve 88 as another example of the temperature-dependent valve 40. This temperature-dependent spool valve 88 includes a spool 89 and the temperature-sensitive member 86 (e.g., shape memory alloy) that is expanded with temperature reduction and is contracted with temperature increase so as to move the spool 89. The temperature-dependent spool valve 88 is disposed in the junction 76. FIG. 9 shows a state in which the temperature To of the lubricant supplied from the first pump P1 is not higher than the predetermined value (shut-off temperature) Toa so that the connecting passage 70 is closed by the spool 89. In this state in which the lubricant temperature To is not higher than the predetermined value Toa, the lubricant supplied from the first pump P1 is delivered to the lubrication-required part 48 but is not delivered to the oil cooler 56. FIG. 10 shows a state in which the temperature To of the lubricant supplied from the first pump P1 is higher than the predetermined value Toa so that the connecting passage 70 is opened by the spool 89 as a result of contraction of the temperature-sensitive member 86, whereby the lubricant supplied from the first pump P1 is delivered to the lubrication-required part 48 and is delivered also toward the oil cooler 56 through the connecting passage 70. It is noted that the temperature-dependent spool valve 88 is constructed such that the lubricant supplied from the first pump P1 is never stopped being delivered to the lubrication-required part 48 in any possible range of the lubricant temperature To within which the temperature To could be fluctuated during operation of the cooling system 60. It is possible to employ an arrangement in which the temperature-sensitive member 86 of the temperature-dependent spool valve 88 is made of a material that is contracted substantially continuously with increase of the lubricant temperature To. In such an arrangement, an opening degree of the temperature-dependent spool valve 88 (that is dependent on a position of the spool 89) is small when the lubricant temperature To is higher than the predetermined value Toa by a small degree, and is increased with increase of the lubricant temperature To.

Figure 11:
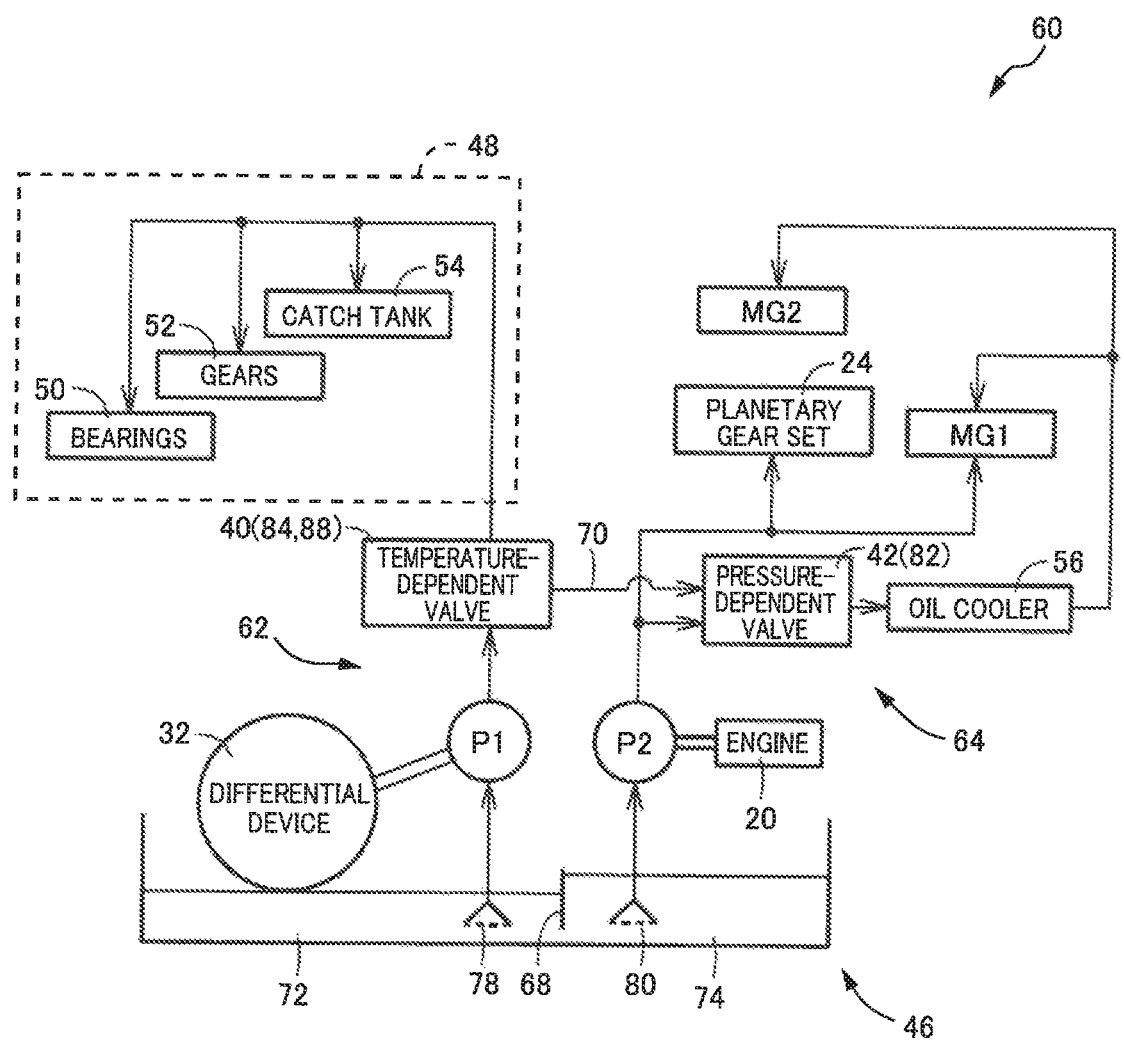
FIG. 11 is a view showing, more in detail, the cooling system shown in FIG. 6.

FIG. 11 is a view showing the cooling system shown 60 that is shown also in FIG. 6. In this FIG. 11, arrangements of the first and second passages 62, 64, lubrication-required part 48 and motor-generators MG1, MG2, which are shown in a simplified manner in FIG. 6, are shown to be more similar to the actual arrangements. The lubricant supplied from the first pump P1 through the first passage 62 is delivered to the temperature-dependent valve 40 disposed in the junction 76 as one of the opposite ends of the connecting passage 70 at which the connecting passage 70 is connected with the first passage 62. When the temperature To of the lubricant supplied from the first pump P1 is not higher than the predetermined value (shut-off temperature) Toa, the delivery of the lubricant supplied from the first pump P1 through the connecting passage 70 toward the second passage 64 is stopped by the temperature-dependent valve 40, as described above. Irrespective of the lubricant temperature To, the lubricant supplied from the first pump P1 is delivered through the first passage 62 to the lubrication-required part 48 which is defined by broken line in FIG. 11 and which is constituted by, for example, the bearings 50, gears 52 and catch tank 54. The bearings 50 are fixed in the transaxle casing (not shown), and the input shaft 22, counter shaft 28 and rotor shaft 30 are held by the bearings 50 so as to be rotatable about their respective axes. A part of the lubricant is temporarily held in the catch tank 54, and then supplied to elements of the lubrication-required part 48. Meanwhile, the lubricant supplied from the second pump P2 through the second passage 64 is delivered to the pressure-dependent valve 42, planetary gear set 24 and first motor-generator MG1. The pressure-dependent valve 42, which is disposed in the junction 77 (at Which the connecting passage 70 is connected to the second passage 64), is configured to allow one of the lubricant supplied from the first pump P1 through the first passage 62, the temperature-dependent valve 40 and the connecting passage 70 and the lubricant supplied from the second pump P2 through the second passage 64, to be delivered toward the oil cooler 56, wherein the allowed one of the lubricant supplied from the first pump P1 and the lubricant supplied from the second pump P2 has a pressure higher than the other. The lubricant delivered to the oil cooler 56 is cooled by the oil cooler 56, and is then delivered to the first and second motor-generators MG1, MG2.

FIG. 12 shows a destination or destinations to which the lubricant is supplied from the first and second pumps P1, P2 during each of the EV running mode and HV running mode. In FIG. 12, a case in which the temperature To of the lubricant supplied from the first pump P1 is not higher than the predetermined value Toa is represented in "LOW TEMPERATURE", while a case in which the temperature To is higher than the predetermined value Toa is represented in "HIGH TEMPERATURE". During the HV running, the first pump P1 is operated accompanying with running of the vehicle 10, and the second pump P2 is operated by drive of the engine 20. The lubricant supplied form the first pump P1 is delivered to the lubrication-required part 48 such at the gears 52 and the bearings 50. However, the pressure of the lubricant supplied from the second pump P2 is higher than the pressure of the lubricant supplied from the first pump P1. Therefore, during the EV running, owing to operation of the pressure-dependent valve 42, irrespective of the lubricant temperature To, the lubricant is not delivered from the first passage 62 toward the oil cooler 56, while the lubricant supplied from the second pump P2 is delivered to the planetary gear set 24 and the first pump P1 and also to the oil cooler 56 through the pressure-dependent valve 42.

During the EV running, the first pump P1 is operated accompanying with running of the vehicle 10 whereby the lubricant is supplied from the first pump P1 to the lubrication-required part 48, while the second pump P2 is not operated since the engine 20 is stopped. That is, during the EV running, the second pump P2 is OFF irrespective of whether the lubricant temperature To is high or low. During the EV running, when the temperature To of the lubricant supplied from the first pump P1 is higher than the predetermined value Toa, the connecting passage 70 is opened by the temperature-dependent valve 40 to allow flow of the lubricant from the first pump P1 to the pressure-dependent valve 42. Further, during the EV running, since the second pump P2 is stopped, the lubricant supplied from the first pump P1 is delivered toward the oil cooler 56 through the pressure-dependent valve 42.

In the present embodiment, the cooling stem 60 includes: the first pump P1 to be mechanically driven accompanying with running of the vehicle 10, to eject lubricant; the first passage 62 configured to supply the lubricant ejected from the first pump P1, to the lubrication-required part 48 of the driving apparatus 12; the second pump P2 to be driven by the engine 20 as the second drive source that is other than the first drive source of the first pump P1, to eject the lubricant; the second passage 64 configured to supply the lubricant ejected from the second pump P2, to the first and second motor-generators MG1, MG2 of the driving apparatus 12 via the oil cooler 56 that is provided in the second passage 64; the connecting passage 70 that connects between the first passage 62 and the junction 77 as the connected portion of the second passage 64, which is located on an upstream side of the oil cooler 56 in a direction of flow of the lubricant; and the temperature-dependent valve 40 provided in the connecting passage 70, and configured to change a connecting-passage flowing amount of the lubricant that flows through the connecting passage 70, depending on the temperature To of the lubricant ejected from the first pump P1, such that a ratio of the connecting-passage flowing amount of the lubricant to a lubricating-passage flowing amount of the lubricant that flows through the first passage 62 is increased with increase of the temperature To of the lubricant ejected from the first pump P1. Thus, even when only the first pump P1 is driven with the second pump P2 being stopped, an increase of the lubricant temperature To causes the lubricant to be supplied through the connecting passage 70 to the second passage 64 that is provided with the oil cooler 56 whereby the lubricant is appropriately cooled.

Further the temperature-dependent valve 40 is configured to maintain supply of the lubricant to the lubrication-required part 48, irrespective of the temperature To of the lubricant ejected from the first pump P1. Thus, the supply of the lubricant to the lubrication-required part 48 is continued irrespective of the lubricant temperature To, so that it is possible to restrain shortage of lubrication of the lubrication-required part 48.

Further, the temperature-dependent valve 40 is configured to close the connecting passage 70 when the temperature To of the lubricant ejected from the first pump P1 is not higher than the predetermined value Toa. Thus, when the lubricant temperature To is not higher than the predetermined value Toa, an amount of the lubricant flowing through the oil cooler 56 is reduced for thereby making it possible to restrain an increase of pressure loss of the lubricant due to an increase of viscosity of the lubricant that could be caused by a reduction of the lubricant temperature To in the oil cooler 56, and also to restrain a fuel economy reduction resulting from the increase of the pressure loss.

Further, the cooling system 60 includes the pressure-dependent valve 42 provided in the junction 77 as the connected portion of the second passage 64, and configured to allow one of (i) the lubricant supplied from the first pump P1 through the first passage 62 and the connecting passage 70 and (ii) the lubricant supplied from the second pump P2 through the second passage 64, to flow through the pressure-dependent valve 42, wherein the above-described one of the lubricant supplied from the first pump P1 and the lubricant supplied from the second pump P2 has a pressure higher than the other. Thus, when the pressure of the lubricant flowing through the second passage 64 is higher than the pressure of the lubricant flowing though the connecting passage 70, the connecting passage 70 is closed by the pressure-dependent valve 42, so that the lubricant supplied from the first pump P1 is delivered only to the lubrication-required part 48 whereby the lubricating performance is increased. Meanwhile, the lubricant supplied from the second pump P2 is delivered to the first and second motor-generators MG1, MG2 through the second passage 64 that is provided with the oil cooler 56 whereby the cooling performance is maintained.

Further, the first pump P1 is to be mechanically driven by the differential ring gear Gd of the differential device 32 of the driving apparatus 12, and the second pump P2 is to be driven by the engine 20 of the driving apparatus 12. Thus, during running of the vehicle 10, the first pump Pus driven whereby the lubricant is supplied to the lubrication-required part 48 that requires to be lubricated during the running. Further, during the HV running of the vehicle 10 in which the engine 20 is driven with the required driving force being large, the second pump P2 is driven whereby the lubricant is appropriately cooled.

Further, the lubricant distribution portion is constituted by the temperature-dependent valve 40 (such as the temperature-dependent opening/closing valve 84 and the temperature-dependent spool valve 88) that includes the temperature-sensitive member 86 having a shape that is changeable depending on the temperature To of the lubricant, such that the temperature-dependent valve 40 changes an opening degree of the connecting passage 70, by change of the shape of the temperature-sensitive member 86 which is caused by change of the temperature To of the lubricant, and the temperature-dependent valve 40 is configured to increase the opening degree of the connecting passage 70 with increase of the temperature To of the lubricant. Thus, the amount of the lubricant flowing through the connecting passage 70 is reduced with reduction of the lubricant temperature To, whereby a pressure loss of the lubricant in the oil cooler 56 is reduced. Further, the opening degree of the connecting passage 70 is increased with increase of the lubricant temperature To, whereby a degree of the lubricant cooling is increased.

There will be described another embodiment of this invention. The same reference signs as used in the above-described first embodiment will be used in the following embodiment, to identify the functionally corresponding elements, and descriptions thereof are not provided.

Second Embodiment

Figure 13:
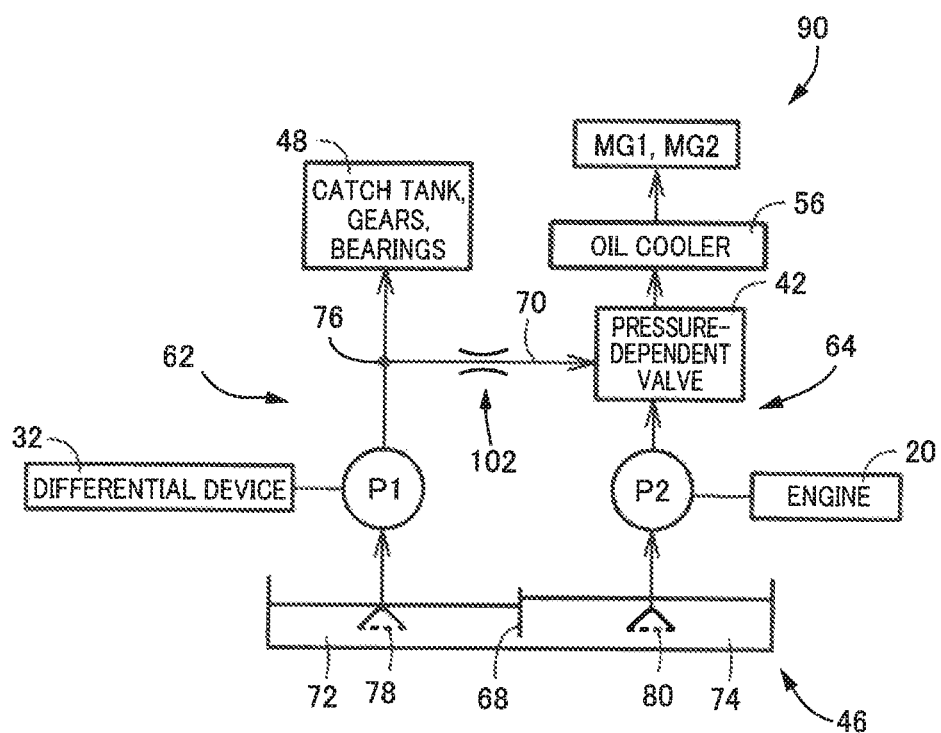
FIG. 13 is a view showing, by way of another example, the cooling system that is different from the cooling system of FIG. 6 in terms of the lubricant distribution portion.

FIG. 13 shows a cooling system 90 constructed according to a second embodiment of the invention in which an orifice 102 is provided in the connecting passage 70. In this cooling system 90, the lubricant distribution portion is constituted by the orifice 102 in place of the temperature-dependent valve 40 that constitutes the lubricant distribution portion of the cooling system 60 of the first embodiment shown in FIGS. 6 and 11. An amount of the lubricant passing through the orifice 102 varies depending on the temperature To of the lubricant. For example, as the temperature To of the lubricant supplied from the first pump P1 is increased, a viscosity of the lubricant is reduced whereby an amount of the lubricant passing through the orifice 102 is increased, as well known. Therefore, when the lubrication-required part 48 is lubricated by only the lubricant supplied from the first pump P1 with the second pump P2 being stopped, the amount of the lubricant delivered toward the oil cooler 56 is increased with increase of the lubricant temperature To, whereby the cooling of the lubricant is accelerated. Further, when only the first pump P1 is operated with the second pump P2 being stopped, the amount of the lubricant delivered toward the oil cooler 56 is reduced with reduction of the lubricant temperature To, whereby the cooling of the lubricant is restrained.

The cooling system 90 according to this second embodiment provides substantially the same technical advantages as provided in the cooling system 60 of the first embodiment. The cooling stem 90 includes: the first pump P1 to be mechanically driven accompanying with running of the vehicle 10, to eject lubricant; the first passage 62 configured to supply the lubricant ejected from the first pump P1, to the lubrication-required part 48 of the driving apparatus 12; the second pump P2 to be driven by the engine 20 as the second drive source that is other than the first drive source of the first pump P1, to eject the lubricant; the second passage 64 configured to supply the lubricant ejected from the second pump P2, to the first and second motor-generators MG1, MG2 of the driving apparatus 12 via the oil cooler 56 that is provided in the second passage 64; the connecting passage 70 that connects between the first passage 62 and the junction 77 as the connected portion of the second passage 64, which is located on an upstream side of the oil cooler 56 in a direction of flow of the lubricant; and the orifice 102 provided in the connecting passage 70, and configured to change a connecting-passage flowing amount of the lubricant that flows through the connecting passage 70, depending on the temperature To of the lubricant ejected from the first pump P1, such that a ratio of the connecting-passage flowing amount of the lubricant to a lubricating-passage flowing amount of the lubricant that flows through the first passage 62 is increased with increase of the temperature To of the lubricant ejected from the first pump P1. Thus, even when only the first pump P1 is driven with the second pump P2 being stopped, an increase of the lubricant temperature To causes the lubricant to be supplied through the connecting passage 70 to the second passage 64 that is provided with the oil cooler 56 whereby the lubricant is appropriately cooled.

Further, the orifice 102 is configured to maintain supply of the lubricant to the lubrication-required part 48, irrespective of the temperature To of the lubricant ejected from the first pump P1. Thus, the supply of the lubricant to the lubrication-required part 48 is continued irrespective of the lubricant temperature To, so that it is possible to restrain shortage of lubrication of the lubrication-required part 48.

Further, the cooling system 90 includes the pressure-dependent valve 42 provided in the junction 77 as the connected portion of the second passage 64, and configured to allow one of (i) the lubricant supplied from the first pump P1 through the first passage 62 and the connecting passage 70 and (ii) the lubricant supplied from the second pump P2 through the second passage 64, to flow through the pressure-dependent valve 42, wherein the above-described one of the lubricant supplied from the first pump P1 and the lubricant supplied from the second pump P2 has a pressure higher than the other. Thus, when the pressure of the lubricant flowing through the second passage 64 is higher than the pressure of the lubricant flowing though the connecting passage 70, the connecting passage 70 is closed by the pressure-dependent valve 42, so that the lubricant supplied from the first pump P1 is delivered only to the lubrication-required part 48 whereby the lubricating performance is increased. Meanwhile, the lubricant supplied from the second pump P2 is delivered to the first and second motor-generators MG1, MG2 through the second passage 64 that is provided with the oil cooler 56 whereby the cooling performance is maintained.

Further, the lubricant distribution portion is the orifice 102. Thus, the amount of the lubricant flowing through the connecting passage 70 can be appropriately adjusted by a simple construction. The amount of the lubricant flowing through the connecting passage 70 is reduced with reduction of the lubricant temperature To, whereby a pressure loss of the lubricant in the oil cooler 56 is reduced. Further, the amount of the lubricant flowing through the connecting passage 70 is increased with increase of the lubricant temperature To, whereby a degree of the lubricant cooling is increased.

In this second embodiment, the orifice 102 as the lubricant distribution portion is provided in the connecting passage 70. However, the provision of the orifice 102 is not essential. For example, a resistance against flow of the lubricant from the junction 76 to the lubrication-required part 48 can be made smaller than a resistance against flow of the lubricant from the junction 76 to the oil cooler 56, by suitably adjusting length and/or diameter of tube or pipe defining the passage. This arrangement provides substantially the same technical advantage as the provision of the orifice 102 in the connecting passage 70. That is, in this arrangement, too, the ratio of the amount of the lubricant flowing through the connecting passage 70, to the amount of the lubricant flowing through the first passage 62 is increased with reduction of the viscosity of the lubricant that is caused by increase of the lubricant temperature To. Further, the above-described ratio is reduced with increase of the viscosity of the lubricant that is caused by reduction of the lubricant temperature To.

There will be described still another embodiment of the invention.

Third Embodiment

Figure 14:
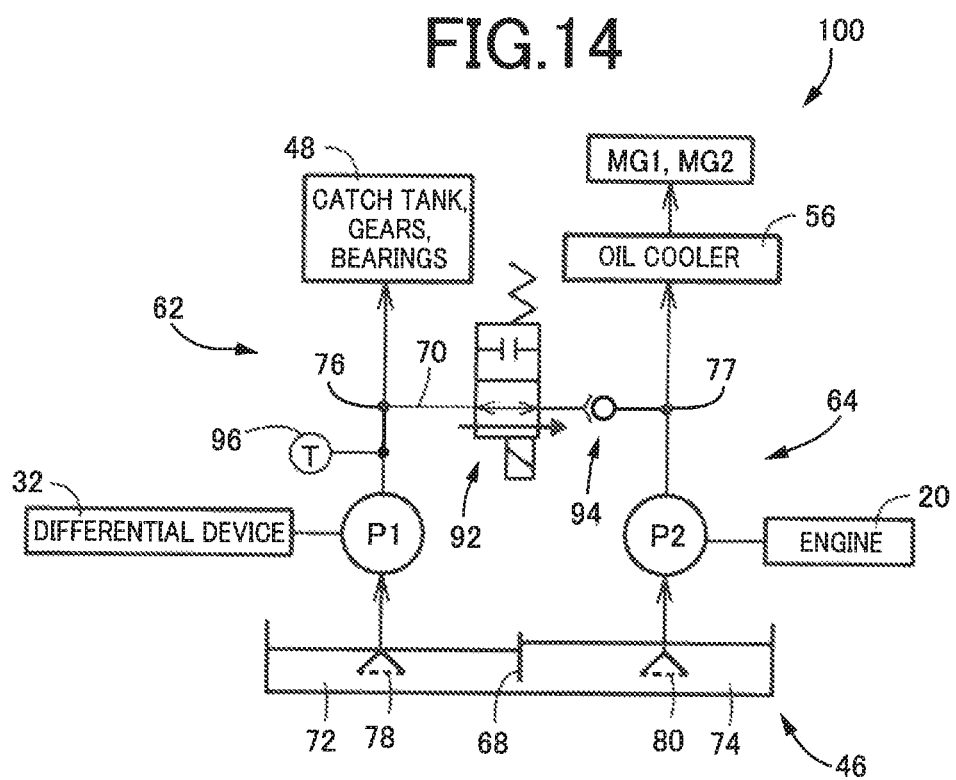
FIG. 14 is a view showing, by way of still another example, the cooling system that is provided with the lubricant distribution portion and the pressure-dependent valve.

FIG. 14 shows a cooling system 100 constructed according to a third embodiment of the invention in which a solenoid opening/closing valve 92 and a check valve 94 are arranged in series in the connection passage 70, in place of the temperature-dependent valve 40 and the pressure-dependent valve 42 that are provided in the respective junctions 76, 77 in the cooling system 60 of the first embodiment. That is, in the third embodiment, the lubricant distribution portion is constituted by the solenoid opening/closing valve 92 that has substantially the same function as the temperature-dependent valve 40. Owing to an electrically-operated solenoid included therein, the solenoid opening/closing valve 92 is configured to close the connecting passage 70 when the temperature To of the lubricant supplied from the first pump P1 is not higher than the predetermined value Toa, and to open the connecting passage 70 when the lubricant temperature To is higher than the predetermined value Toa. The determination as to whether the temperature To is higher than the predetermined value Toa or not is made, for example, based on a value of the temperature To measured by a known fluid temperature sensor 96 that is disposed in the first passage 62 or the first lubricant storing portion 72. The check valve 94 is configured to close the connecting passage 70 when the second pump P2 is operated to make the pressure of the lubricant supplied from the second pump P2 higher than the pressure of the lubricant supplied from the first pump P1, and to allow the lubricant to be delivered from the first passage 62 toward the second passage 64 owing to pressure of the lubricant supplied from the first pump P1 when the second pump P2 is stopped. Thus, the check valve 94 has substantially the same function as the above-described pressure-dependent valve 42.

In this third embodiment, the lubricant distribution portion includes the solenoid opening/closing valve 92 configured to selectively open and close the connecting passage 70. The connecting passage 70 is provided with the check valve 94 which is configured to inhibit flow of the lubricant in a direction toward the first passage 62 away from the second passage 64, and to allow flow of the lubricant in a direction toward the second passage 64 away from the first passage 62. The solenoid opening/closing valve 92 and the check valve 94 are disposed in series in the connecting passage 70. Thus, when the lubricant temperature To (i.e., the temperature To of the lubricant ejected from the first pump P1) is not higher than the predetermined value Toa, the connecting passage 70 is closed whereby an amount of the lubricant flowing through the oil heater 56 is reduced for thereby making it possible to restrain an increase of pressure loss of the lubricant due to an increase of viscosity of the lubricant that could be caused by a reduction of the lubricant temperature To in the oil heater 56, and also to restrain a fuel economy reduction resulting from the increase of the pressure loss. Further, when the lubricant temperature To is higher than the predetermined value Toa, a part of the lubricant ejected by the first pump P1 as well as the lubricant ejected by the second pump P2 is delivered to the second passage 64, so that the ratio of the amount of the lubricant flowing through the connecting passage 70, to the amount of the lubricant flowing through the first passage 62 is increased, whereby the degree of the lubricant cooling is increased. Therefore, the cooling system 100 according to this third embodiment provides substantially the same technical advantages as provided in the cooling system 60 of the first embodiment.

There will be described still another embodiment of the invention.

Fourth Embodiment

Figure 15:
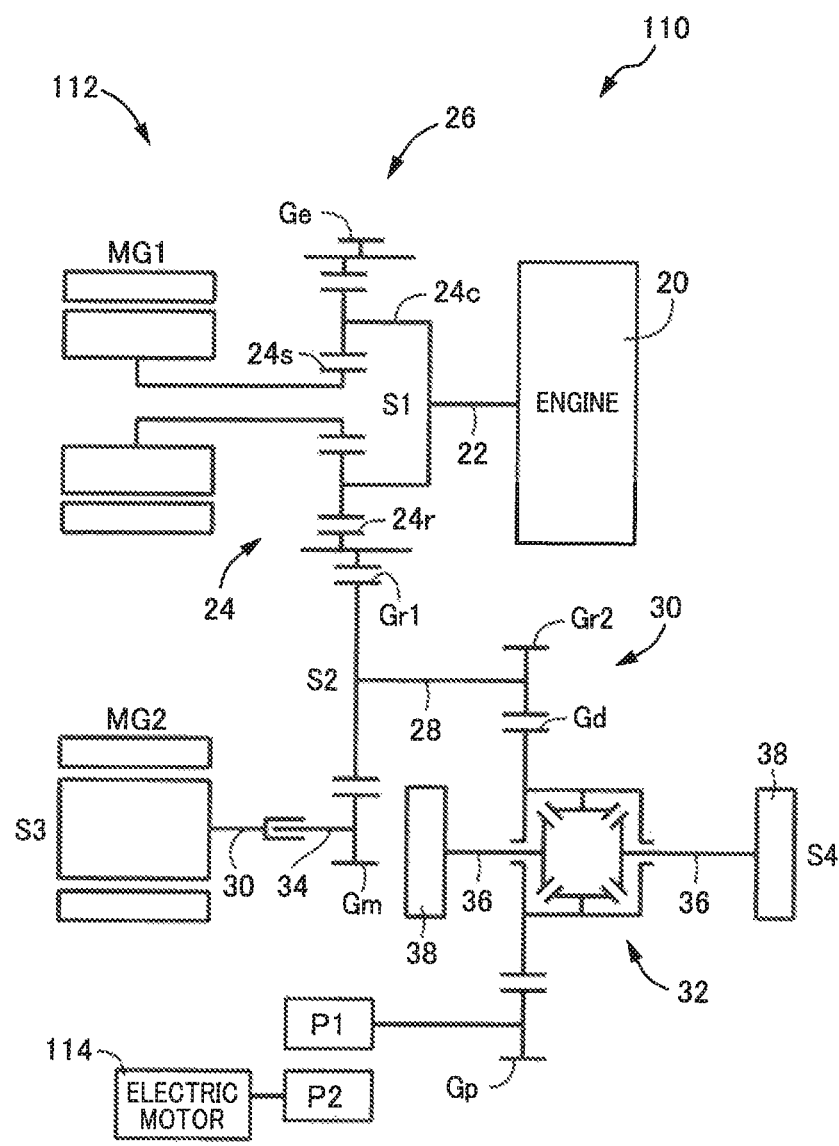
FIG. 15 is a schematic view showing a driving apparatus of a hybrid vehicle which is different from the hybrid vehicle of FIG. 1 in terms of a drive source for driving one of two oil pumps of the cooling system.

FIG. 15 shows a driving apparatus 112 of a hybrid vehicle 110 that is different from the hybrid vehicle 10 of FIG. 1. This vehicle 110 is different from the vehicle 10 in that the second pump P2 is an oil pump to be driven by an electric motor 114 rather than by the engine 20. In this fourth embodiment, when the engine 20 is driven, the electric motor 114 is operated to be rotated whereby the second pump P2 is driven by the electric motor 114 in place of the engine 20.

In this fourth embodiment, any one of the cooling systems 60, 90, 100 according to the above-described respective first through third embodiments can be employed so that substantially the same technical advantages as in the first through third embodiments can be provided. Further, it is possible to employ an arrangement in which, for example, a rotation of the electric motor 114 is adjusted depending upon increase or reduction of the lubricant temperature To, whereby the amount of the lubricant supplied from the second pump P2 can be adjusted depending on the lubricant temperature To.

There will be described still another embodiment of the invention.

Fifth Embodiment

Figure 16:
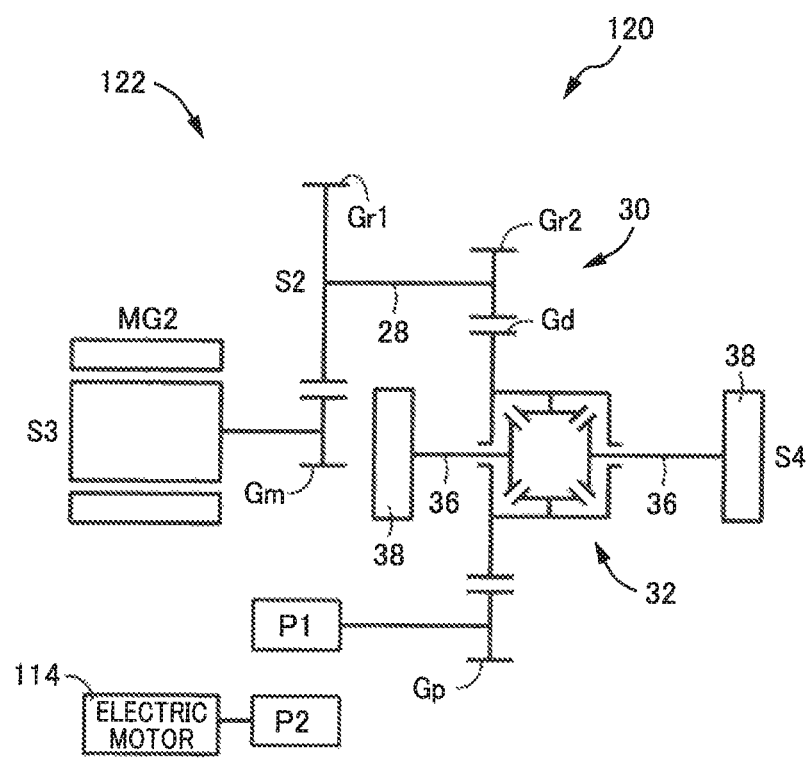
FIG. 16 is a schematic view showing a driving apparatus of another vehicle to which the present invention is advantageously applied.

FIG. 16 shows, by way of example, a driving apparatus 122 of an electric vehicle 120 having, as the drive power source for driving the vehicle 120, only the second motor-generator MG2 without an engine. This fifth embodiment is different from the first embodiment in that the vehicle 120 does not include the engine 20 and the electrically-controlled differential portion 26 (that is constituted mainly by the first motor-generator MG1 and the planetary gear set 24), which are included in the vehicle 10 in the first embodiment, so that the second pump P2 is an electrically-controlled oil pump that is to be driven by the electric motor 114 exclusively serving to drive the pump P2, rather than being a mechanically-operated oil pump driven by an engine. Thus, in this fifth embodiment, the electric motor 114 corresponds to the second drive source recited in the appended claims.

As in the fourth embodiment, in this fifth embodiment, the electric motor 114 is operated to be rotated whereby the second pump P2 is driven by the electric motor 114 in place of the engine 20. Further, any one of the cooling systems 60, 90, 100 according to the above-described respective first through third embodiments can be employed so that substantially the same technical advantages as in the first through third embodiments can be provided. Moreover, it is possible to employ the arrangement in which, for example, the rotation of the electric motor 114 is adjusted depending upon increase or reduction of the lubricant temperature To, whereby the amount of the lubricant supplied from the second pump P2 can be adjusted depending on the lubricant temperature To.

In the above-described embodiments, the first pump P1 is driven by the differential ring gear Gd of the differential device 32. However, the first pump P1 may be driven by any one of the other gears such as the small-sized reduction gear Gr2 of the counter shaft 28.

It is to be understood that the embodiments described above are given for illustrative purpose only, and that the present invention may be embodied with various modifications and improvements which may occur to those skilled in the art.

NOMENCLATURE OF ELEMENTS 10,110,120: vehicle
12,112,122: driving apparatus
20: engine
40: temperature-dependent valve (lubricant distribution portion)
42: pressure-dependent valve
48: lubrication-required part
56: oil cooler (heat exchanger)
60; 90; 100: cooling system
62: first passage (lubricating passage)
64: second passage (cooling passage)
70: connecting passage
86: temperature-sensitive member
92: solenoid opening/closing valve (opening/closing valve)
94: check valve
102: orifice
114: electric motor
P1, P2: first pump, second pump
MG1, MG2: first motor-generator, second motor-generator (rotary electric machine)
To: temperature of lubricant
Toa: shut-off temperature (predetermined value)
Gd: differential ring gear

What is claimed is:

1. A cooling system for a driving apparatus that is provided in a vehicle for driving the vehicle,
said cooling system comprising:
a first pump that is to be mechanically driven accompanying with running of the vehicle, to eject lubricant;
a lubricating passage configured to supply the lubricant ejected from said first pump, to a lubrication-required part of the driving apparatus;
a second pump that is to be driven by a second drive source that is other than a first drive source of said first pump, to eject the lubricant;
a cooling passage configured to supply the lubricant ejected from said second pump, to a rotary electric machine of the driving apparatus via a heat exchanger that is provided in said cooling passage;
a connecting passage that connects between said lubricating passage and a connected portion of said cooling passage, said connected portion being located on an upstream side of said heat exchanger in a direction of flow of the lubricant; and
a lubricant distribution portion provided in said connecting passage, and configured to change a connecting-passage flowing amount of the lubricant that flows through said connecting passage, depending on a temperature of the lubricant ejected from said first pump, such that a ratio of the connecting-passage flowing amount of the lubricant to a lubricating-passage flowing amount of the lubricant that flows through said lubricating passage is increased with increase of the temperature of the lubricant ejected from said first pump.

2. The cooling system according to claim 1, wherein said lubricant distribution portion is configured to maintain supply of the lubricant to the lubrication-required part, irrespective of the temperature of the lubricant ejected from said first pump.

3. The cooling system according to claim 1, wherein said lubricant distribution portion is configured to close said connecting passage when the temperature of the lubricant ejected from said first pump is not higher than a predetermined value.

4. The cooling system according to claim 1, comprising a pressure-dependent valve provided in said connected portion of said cooling passage, and configured to allow one of (i) the lubricant supplied from said first pump through said lubricating passage and said connecting passage and (ii) the lubricant supplied from said second pump through said cooling passage, to flow through said pressure-dependent valve, wherein said one of the lubricant supplied from said first pump and the lubricant supplied from said second pump has a pressure higher than the other.

5. The cooling system according claim 1, wherein said lubricant distribution portion includes an opening/closing valve configured to selectively open and close said connecting passage,
said connecting passage is provided with a check valve configured to inhibit flow of the lubricant in a direction toward said lubricating passage away from said cooling passage, and
said opening/closing valve and said check valve are disposed in series in said connecting passage.

6. The cooling system according to claim 1, wherein said first pump is to be mechanically driven by a differential ring gear of the driving apparatus, and said second pump is to be driven by an engine of the driving apparatus.

7. The cooling system according to claim 1, wherein said lubricant distribution portion is a temperature-dependent valve that includes a temperature-sensitive member having a shape that is changeable depending on the temperature of the lubricant, such that said temperature-dependent valve changes an opening degree of said connecting passage, by change of said shape of said temperature-sensitive member which is caused by change of the temperature of the lubricant, and said temperature-dependent valve is configured to increase the opening degree of said connecting passage with increase of the temperature of the lubricant.

8. The cooling system according to claim 1, wherein said lubricant distribution portion is an orifice provided in said connecting passage.

9. The cooling system according to claim 1, wherein said second oil pump is to be driven by an electric motor that is other than the rotary electric machine.

* * * * *